United States Patent
Koma

(10) Patent No.: US 6,369,870 B1
(45) Date of Patent: Apr. 9, 2002

(54) LIQUID CRYSTAL DISPLAY DEVICE HAVING REFLECTIVE ELECTRODES FOR CONTROLLING THE AZIMUTH OF THE LIQUID CRYSTAL

(75) Inventor: Norio Koma, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/064,549

(22) Filed: Apr. 22, 1998

(30) Foreign Application Priority Data

Apr. 24, 1997 (JP) ............................................. 9-107883

(51) Int. Cl.⁷ ....................... G02F 1/1337; G02F 1/133; G02F 1/13
(52) U.S. Cl. ......................... 349/130; 349/113; 349/181
(58) Field of Search ........................... 349/113, 99, 130, 349/143, 178, 181

(56) References Cited

U.S. PATENT DOCUMENTS

| | | | | |
|---|---|---|---|---|
| 4,767,190 A | * | 8/1988 | Dir et al. ..................... | 349/102 |
| 5,238,435 A | | 8/1993 | Te Velde ...................... | 495/29 |
| 5,608,556 A | * | 3/1997 | Koma ......................... | 349/143 |
| 5,666,179 A | | 9/1997 | Koma ......................... | 349/143 |

FOREIGN PATENT DOCUMENTS

| | | |
|---|---|---|
| EP | 0 751 417 A1 | 1/1997 |
| JP | 06-301036 | 10/1994 |

OTHER PUBLICATIONS

Yamamoto, et al. "Full–Cone Wide–Viewing–Angle Multicolor CSH–LCD," XP 000503124, SID 91 Digest, pp. 761–765.

* cited by examiner

Primary Examiner—Toan Ton
(74) Attorney, Agent, or Firm—Hogan & Hartson, LLP

(57) ABSTRACT

A reflective type liquid crystal display device comprises a liquid crystal sandwiched between first and second substrates, a transparent electrode and a reflective electrode (10) for driving the liquid crystal formed on the mutually opposed inside faces of the respective substrates, and a polarizing plate formed on the outside faces of the substrates having the transparent electrode, wherein the liquid crystal in an initial align state has its optical axis controlled into directions of the normal lines of the substrates. A polarization axis direction (2) of the polarizing plate is designed to form an angle of 45 degrees with respect to azimuth (3, 4, 5) of the optical axis of the liquid crystal when a voltage for driving the liquid crystal is applied between the electrodes. The transparent electrode comprises an orientation control window (11), which is formed at the center or to extend along a diagonal line of the reflective electrode (10). The window (11) fixes disclination of the orientation of the liquid crystal controlled into the directions which are different on respective sides of the reflective electrode (10) to stabilize the orientation of the liquid crystal as the whole. The orientation of the liquid crystal can be more accurately controlled by an orientation control electrode (13) disposed around the reflective electrode (10).

15 Claims, 15 Drawing Sheets

LIQUID CRYSTAL DISPLAY DEVICE HAVING REFLECTIVE ELECTRODES FOR CONTROLLING THE AZIMUTH OF THE LIQUID CRYSTAL

BACKGROUND OF THE INVENTION a) Field of the Invention

The invention relates to a liquid crystal display device (LCD) for display utilizing electrooptical anisotropy of liquid crystal, and more particularly to a reflective liquid crystal display device.

b) Description of the Related Art

LCDs have advantages in that they are small, thin, and consume little power, and are therefore widely put to practical use in OA and AV equipment. Especially, active matrix LCDs having a thin film transistor (hereinafter referred to as TFT) as a switching element can perform static driving at a duty ratio of 100% in multiplex and are used for large-screen, high-resolution animation display.

TFTs are field effect transistors and are commonly disposed in matrix patterns on a substrate and connected to a display electrode configuring one of electrodes of a pixel capacitor with the liquid crystal as a dielectric layer. TFTs disposed on the same row are turned on/off simultaneously by a gate line, while a pixel signal voltage is applied through a drain line. Thus, the pixel capacitor connected to the TFTs which are designated in a matrix and turned on respectively, the displaying voltage is applied between the electrodes of the pixel capacitor according to the display content, and the pixel capacitor is charged. The display electrode and the TFT are formed on the same substrate, a common electrode configuring the other electrode of the pixel capacitor is formed on the entire plane of the other substrate which is disposed to oppose the former substrate with the liquid crystal layer intervened between them. In other words, the liquid crystal and the common electrode are divided by the display electrode, and each division forms each display pixel. The pixel capacitor is charged while the TFT is on, and the voltage which is kept by the capacitor is kept insulated by the off-resistance of the TFT for a duration of one field until the TFT is next turned on. The liquid crystal has electrooptical anisotropy and its optical properties are controlled according to the voltage applied to the pixel capacitor. By controlling a transmission factor of each display pixel, lightness or darkness of each display pixel creates displayed images.

The liquid crystal has its initial align state flexibly fixed by an alignment layer formed on the interfaces between the liquid crystal layer and both substrates.

LCD having a nematic phase liquid crystal with a negative anisotropy of dielectric constant includes a so-called VAN (vertically aligned nematic) type LCD having a vertical alignment layer for the alignment layer. VAN is one of the electrically controlled birefringence (ECB) modes and uses a difference between refractive indexes of ordinary and extraordinary axes of the liquid crystal molecules, namely birefringence, to control a transmittance. In a VAN type LCD, when a voltage is applied, an incident linear polarized light, which has penetrated one of the cross disposed polarizing plates, is birefracted in the liquid crystal layer into an elliptic polarized light. Retardation, the difference of phase velocity between ordinary and extraordinary ray components in the liquid crystal, is controlled according to an electric field strength of the liquid crystal layer and light is emitted from another polarizing plate at a desired transmittance. When the applied voltage is increased from a state with no application thereof, display changes from black to white. Therefore, the display type is a normally black mode.

As described above, liquid crystal display devices consume little power because they are prepared into a precondition ready to display by controlling the optical properties of the liquid crystal layer for each pixel by the voltage control. However, to make a display screen formed by the liquid crystal display device actually visible, a backlight is usually provided on the opposite side of the display device from that viewed in order to recognize the display pixel from transmitted light, thereby making the display pixel formed on the transparent substrate visible. The resulting disadvantage that the backlight consumes high power, means that the low power advantage of these LCDs can not be fully taken advantage of.

Consequently, there has been developed a reflective type liquid crystal display device in which a reflector is disposed on the back of the liquid crystal display device or the display electrodes is made of a material having a high reflectance to make the reflective electrode visible by utilizing environmental light, thereby making the display screen visible. Such a reflective liquid crystal display device does not require a backlight, and its power consumption is greatly lowered. It is, however, then necessary to enhance brightness and a contrast ratio in order to improve a display quality level.

SUMMARY OF THE INVENTION

It is an object of the present invention to suitably control the alignment of liquid crystal of a reflective liquid crystal display device in order to enable high quality display over a wider viewing angle.

The invention was completed to achieve the above-described object and relates to a reflective liquid crystal display device, which comprises a liquid crystal sandwiched between first and second substrates, a transparent electrode and a reflective electrode for driving the liquid crystal formed on the mutually opposed inside faces of the respective substrates, and a polarizing plate formed on the outside face of one of the first or second substrates, wherein the liquid crystal has an optical axis in its initial align state controlled into directions of the normal lines of the substrates; and, when a voltage for driving the liquid crystal is applied between the electrodes, the liquid crystal is tilted to have an azimuth of the optical axis on a plane component of the substrate form an angle of 45 degrees with respect to a polarization axis direction of the polarizing plate.

Thus, the reflectance is adjusted very accurately and gradational display is achieved by the voltage control.

The contrast ratio and response characteristic are also improved and the viewing angle can be increased by dividing the alignment of liquid crystal within the pixel.

In another aspect of the present invention, a vertical alignment layer, which controls the direction of the optical axis in the initial align state of the liquid crystal, is formed on the respective opposed inside faces of the two substrates; and the vertical alignment film is rubbed previously in order to tilt the initial alignment slightly from the directions of the normal lines of the substrates, and the liquid crystal, when the voltage for driving the liquid crystal is applied, is controlled so that the azimuth that the optical axis of the liquid crystal is inclined forms an angle of 45 degrees with respect to the polarization axis direction of the polarizing plate.

The application of a voltage for driving the liquid crystal physically controls the liquid crystal to direct its orientation into a predetermined direction and also tilt with respect to the plane face of the substrate so to enable modulation of the incident light.

In another reflective liquid crystal display device of the invention, the transparent electrode has an orientation control window not having any electrode; and, when the voltage for driving the liquid crystal is applied, the azimuth that the tilting optical axis of the liquid crystal is controlled to be 45 degrees with respect to the polarization axis direction of the polarizing plate by a non-electric field or a weak electric field produced by the orientation control window and an electric field which is produced in an inclined direction at the edges of the reflective electrode separately formed for each display pixel.

The orientation control window is formed to substantially oppose the center of the opposed face of the reflective electrode. Otherwise, the orientation control window crosses the opposed region at the center of the reflective electrode and fixes disclination of the liquid crystal into a predetermined shape in a region where the reflective electrode is formed.

As described above, by a non-electric field or a weak electric field produced by the orientation control window and an electric field which is produced in a slanting direction in the edges of the reflective electrode, the form of an electric field applied to the liquid crystal for each reflective electrode-forming region is adjusted and variations in shape of the disclination for the respective reflective electrode-forming region is prevented. The application of the voltage for driving the liquid crystal between the electrodes controls physically the respective liquid crystal molecules to direct the orientation of them into a predetermined azimuth direction and also to tilt with respect to the plane face of the substrate so to enable modulation of the incident light. Accordingly, the reflectance of the liquid crystal display device is very accurately adjusted.

According to a further aspect of the present invention, one of the two substrates, on which the reflective electrode is formed has an orientation control electrode formed in the periphery of the reflective electrode in order to generate an electric field in a horizontal direction when the voltage for driving the liquid crystal is applied; an orientation control window not having an electrode is formed in the transparent electrode; and, when the voltage for driving the liquid crystal is applied, the azimuth that the tilting optical axis of the liquid crystal is controlled to make an angle of 45 degrees with respect to the polarization axis direction of the polarizing plate by a non-electric field or a weak electric field produced by the orientation control window and an electric field in the neighborhood of the edge of the reflective electrode controlled by the orientation control electrode.

Thus, by controlling the applied voltage, the orientation controlling actions of both the orientation control window and the orientation control electrode act to forcedly adjust the shape of an electric field, the orientation of liquid crystal is controlled to have a tilt angle in an azimuth to modulate more effectively the incident light, and the reflectance can be very accurately adjusted.

Also according to the present invention, an anisotropy of electrode index $\Delta n$ of the liquid crystal and a distance d between the first and second electrodes satisfy the following equation $\Delta n \cdot d \leq -0.4d + 0.95$. By selecting a liquid crystal material and/or configuring the liquid crystal display device so that $\Delta n \cdot d$ satisfies the above equation, the orientation of the liquid crystal can be controlled without fail, and a response time before the liquid crystal starts to incline when the voltage for driving the liquid crystal is applied can be made short.

Also, according to the present invention, the orientation control electrode is formed on the same plane where the reflective electrode is formed, but is formed away from the reflective electrode.

By configuring as described above, little unevenness is formed on the interfaces between the substrates and the liquid crystal layer by virtue of the presence of the orientation control window, and the liquid crystal can be prevented from having disorder in alignment. The orientation control electrode can be formed simultaneously with the reflective electrode.

The reflective crystal display device according to the present invention may further comprise thin film transistors which are separately connected to the multiple reflective electrodes and covered from above with the reflective electrodes through a planarization insulating film.

As described above, by covering the thin film transistors with the reflective electrode from their above, the alignment of liquid crystal can be prevented from being disturbed by the thin film transistors. An aperture ratio of the display device can be enlarged to its limit.

DESCRIPTION OF THE PREFERRED EMBODIMENTS

Figure 1A:
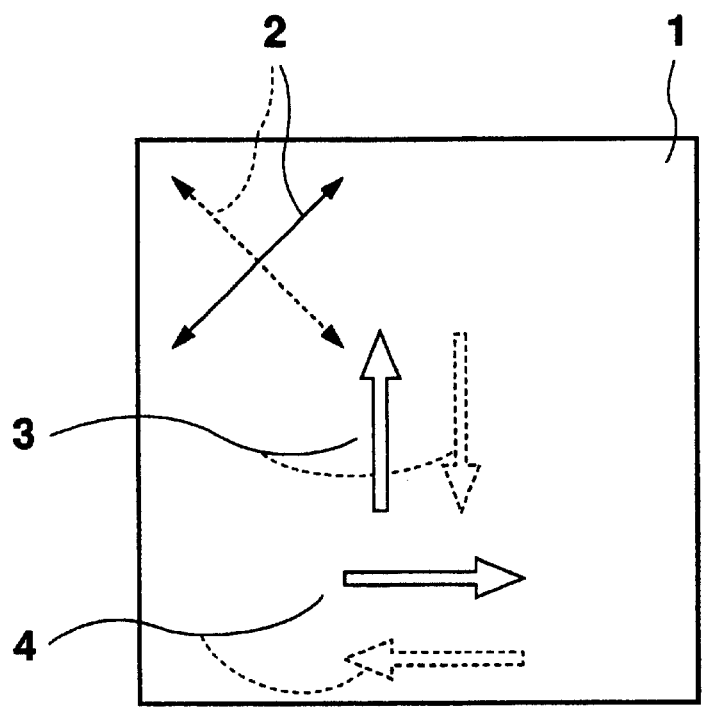
FIG. 1A and FIG. 1B are conceptual diagrams showing a relationship between the orientation of liquid crystal and the polarizing axis of a polarizing plate of a reflective liquid crystal display device according to an embodiment of the invention.
Figure 1B:
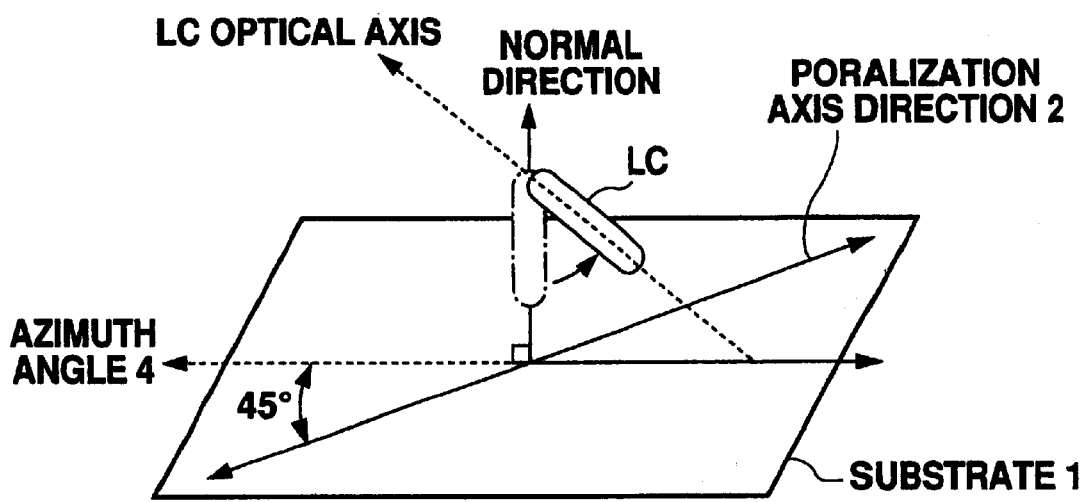

FIG. 1A and FIG. 1B are conceptual diagrams of a liquid crystal display device according to the present invention. In these drawings, reference numeral 1 denotes a liquid crystal panel, 2 a direction of a polarizing axis of a polarizing plate disposed on the outer surface of the liquid crystal panel 1, and 3, 4 plan e components, namely, azimuth angles, of changing orientation of the liquid crystal. The liquid crystal panel 1 comprises liquid crystal sandwiched between two substrates, which have transparent electrodes and reflective electrodes for driving the liquid crystal on their opposed inner faces. The reflective electrode is formed on the substrate positioned at the back when an observer sees the liquid crystal panel so that light reflected on the reflective electrode through the liquid crystal and the transparent electrode emits of the liquid crystal panel so to be visually recognized. The polarizing plate is disposed on the substrate which is closest to and on the side of the observer.

The liquid crystal has a negative anisotropy of dielectric constant, and when it is in an initial condition, the orientation vector of liquid crystal molecules, namely the direction of an optical axis corresponding to the major axis direction of the LC molecules, is vertically controlled with respect to the plane face of the substrate as indicated by one dotted line in FIG. 1B. Application of a voltage for driving the liquid crystal between the reflective electrode and the transparent electrode sets the azimuth angle of the optical axis direction to make an angle of 45 degrees with respect to the polarization axis 2 (3) of the polarizing plate and to incline to an angle according to the applied voltage with respect to a plane component of the substrate as indicated by the solid lines in FIG. 1B.

Figure 1C:
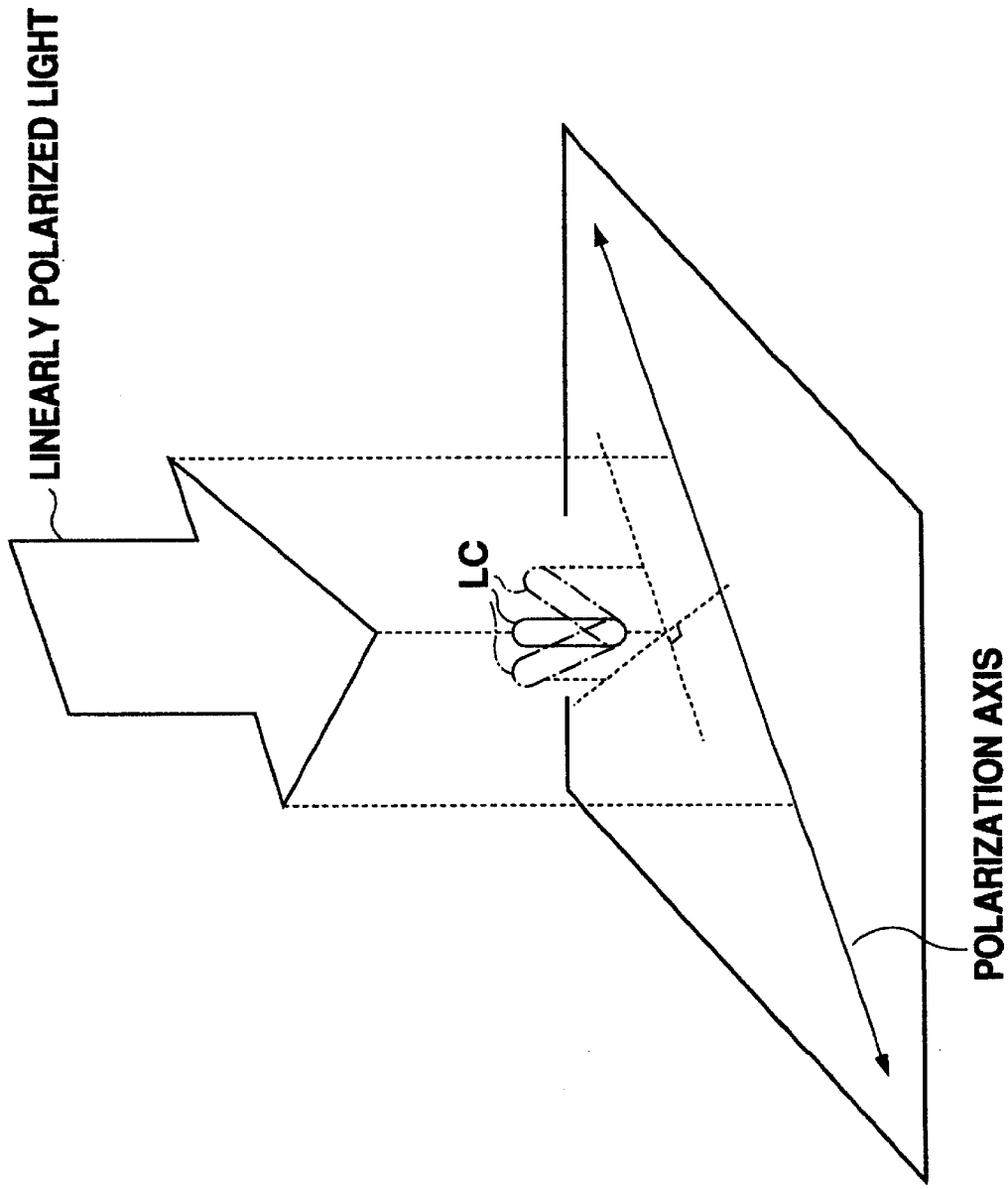
FIG. 1C and FIG. 1D are conceptual diagrams showing a relationship between the orientation of liquid crystal and linear polarization according to an embodiment of he invention.

Liquid crystal molecules, which are optically uniaxial, have a different refractive index between the optical axis direction and the direction which is at right angles to the optical axis. In other words, the liquid crystal molecules have an anisotropy of refractive index. When light having entered the liquid crystal layer refracts, a phase velocity is different between a component (namely, an extraordinary ray component) of the optical axis direction (in the plane perpendicular to the forwarding direction of light) and a component (namely, an ordinary ray component) in the direction at right angles to it. When linear polarized light enters the liquid crystal layer of the liquid crystal display device as shown in FIG. 1C, there is no ordinary ray component if the linear polarized light enters in a direction parallel to the optical axis of the liquid crystal molecules, and there is no extraordinary ray component if the light enters in a direction perpendicular to the optical axis of the liquid crystal molecules. Therefore, the transmitted linear polarized light is not subjected to birefringence and remains unchanged after passing through the liquid crystal layer. Thus, the linear polarized light having entered the liquid crystal layer through the polarizing plate is reflected on the reflective electrode and passes through the same polarizing plate again, resulting in making white display. Such orientation cannot change the transmittance, even if the tilt angle of the liquid crystal molecules is changed.

Figure 1D:
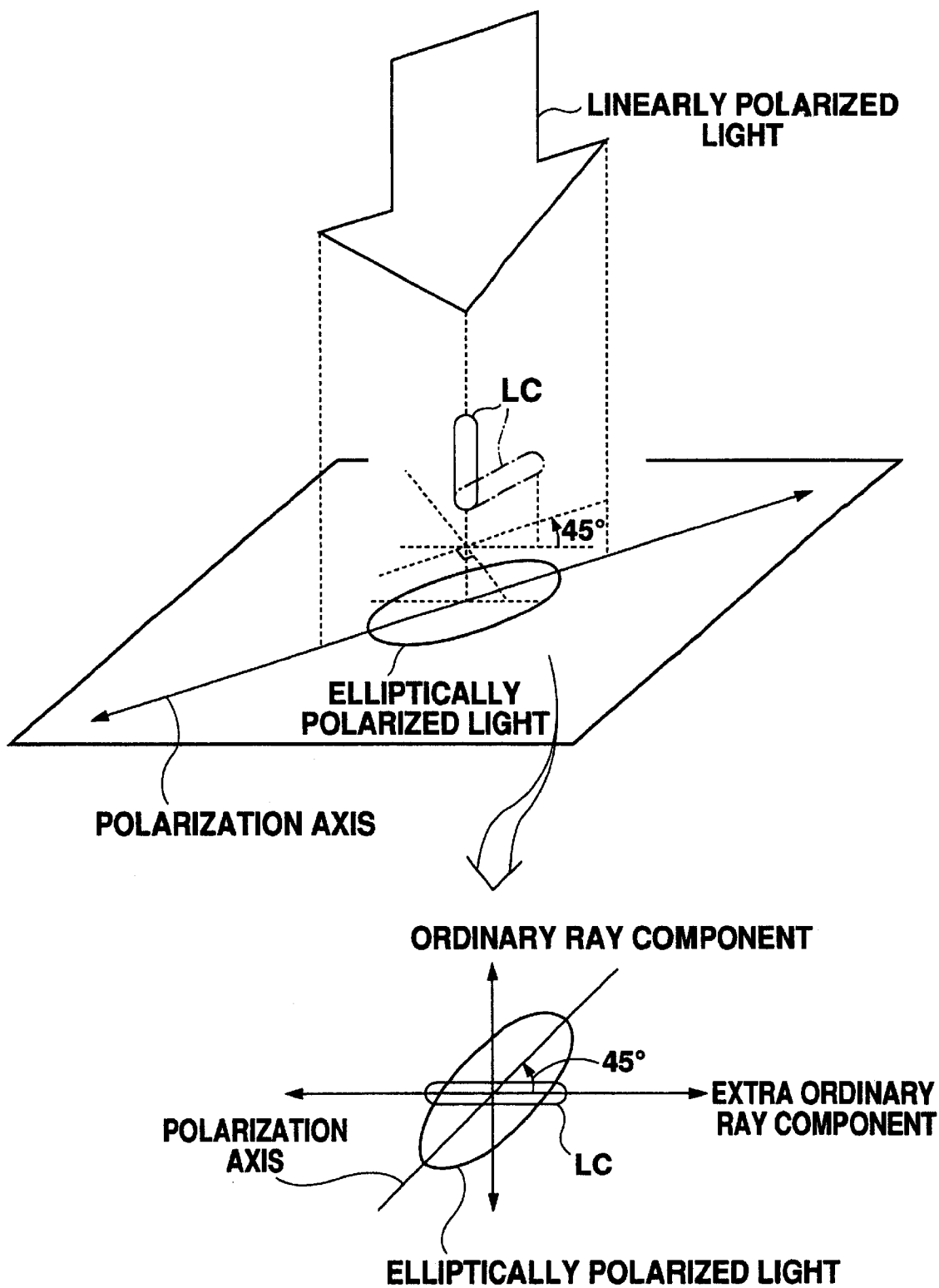

As show in FIG. 1D, when the polarization direction of the incident linear polarized light, namely the polarizing axis of the polarizing plate makes a 45 degrees with the plane component of the optical axis of the liquid crystal molecules under control, the linear polarized light having entered the liquid crystal layer causes the extraordinary ray component in the optical axis direction of the liquid crystal and the ordinary ray component in the direction perpendicular to the optical axis. The produced extraordinary ray component and ordinary ray component are combined so that the entered linear polarized light changes an elliptic polarized light as shown in FIG. 1D. In other words, the linear polarized light changes to elliptic polarized light while it is reflected by the reflective electrode to go and return in the liquid crystal layer. As a result, it cannot pass through the polarizing plate, and the display becomes black, since the thickness of the liquid crystal layer is adjusted previously to be able to display black at this state.

As described above, the linear polarized light having entered the liquid crystal layer through the polarizing plate creates birefringence owing to the liquid crystal molecules which have their orientation controlled by the applied voltage as shown in FIG. 1B. Thus, the linear polarized light changes into the elliptic polarized light having the components of an ordinary ray and an extraordinary ray which are mutually intersected at right angles. The tilt angle of the liquid crystal optical axis with respect to the normal line of the substrate is controlled very accurately according to the voltage applied to the liquid crystal. Therefore, the birefringence determined by the tilt angle is accurately controlled. As a result, the intensity of light reflected by the reflective electrode is very accurately controlled by the voltage applied to the liquid crystal.

Figure 2:
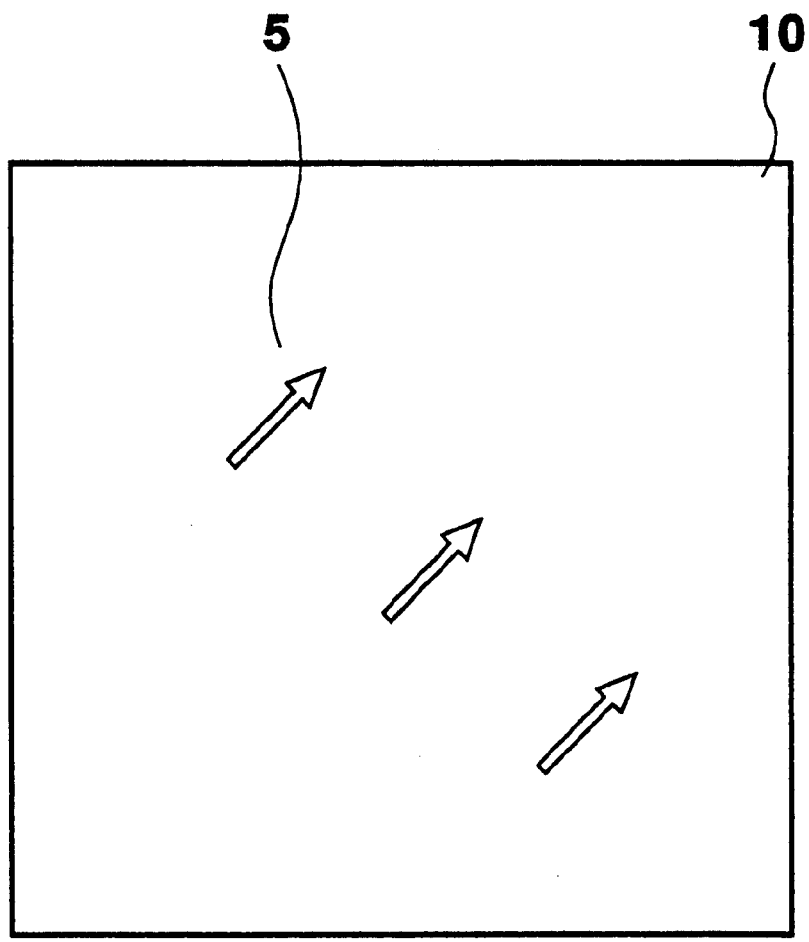
FIG. 2 is a conceptual diagram showing a reflective liquid crystal display device according to a first embodiment of the invention.
Figure 2:
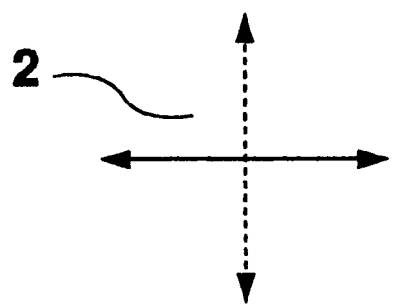

FIG. 2 is a plan view illustrating a first embodiment of the invention. A transparent substrate having the transparent electrode disposed is on this side of the liquid crystal and a substrate having the reflective electrode is on the other side of the liquid crystal. The reflective electrode 10 configures a display pixel with the liquid crystal and the transparent electrode divided. A vertical alignment layer is formed on the inside surface of a liquid crystal panel in order to align the liquid crystal vertically, this alignment layer has undergone a predetermined rubbing treatment, and the liquid crystal molecules are previously put on a pretilt state that they are tilted to make a predetermined very small angle with respect to the nominal direction of the substrate. The pretilt makes a lead that the liquid crystal starts to tilt according to the applied voltage, and an azimuth angle 5, that the liquid crystal tilts, can be uniformlymade in a direction to increase the pretilt angle in the shortest time. In FIG. 2, the polarizing axis is determined in directions of a double-headed arrow 2 indicated by a solid or dotted line. The linear polarized light through the polarizing plate enters at 45 degrees with respect to the plane component of the optical axis of the liquid crystal, and its reflectance is adjusted very accurately according to a level of the tilt angle of the liquid crystal.

Figure 3:
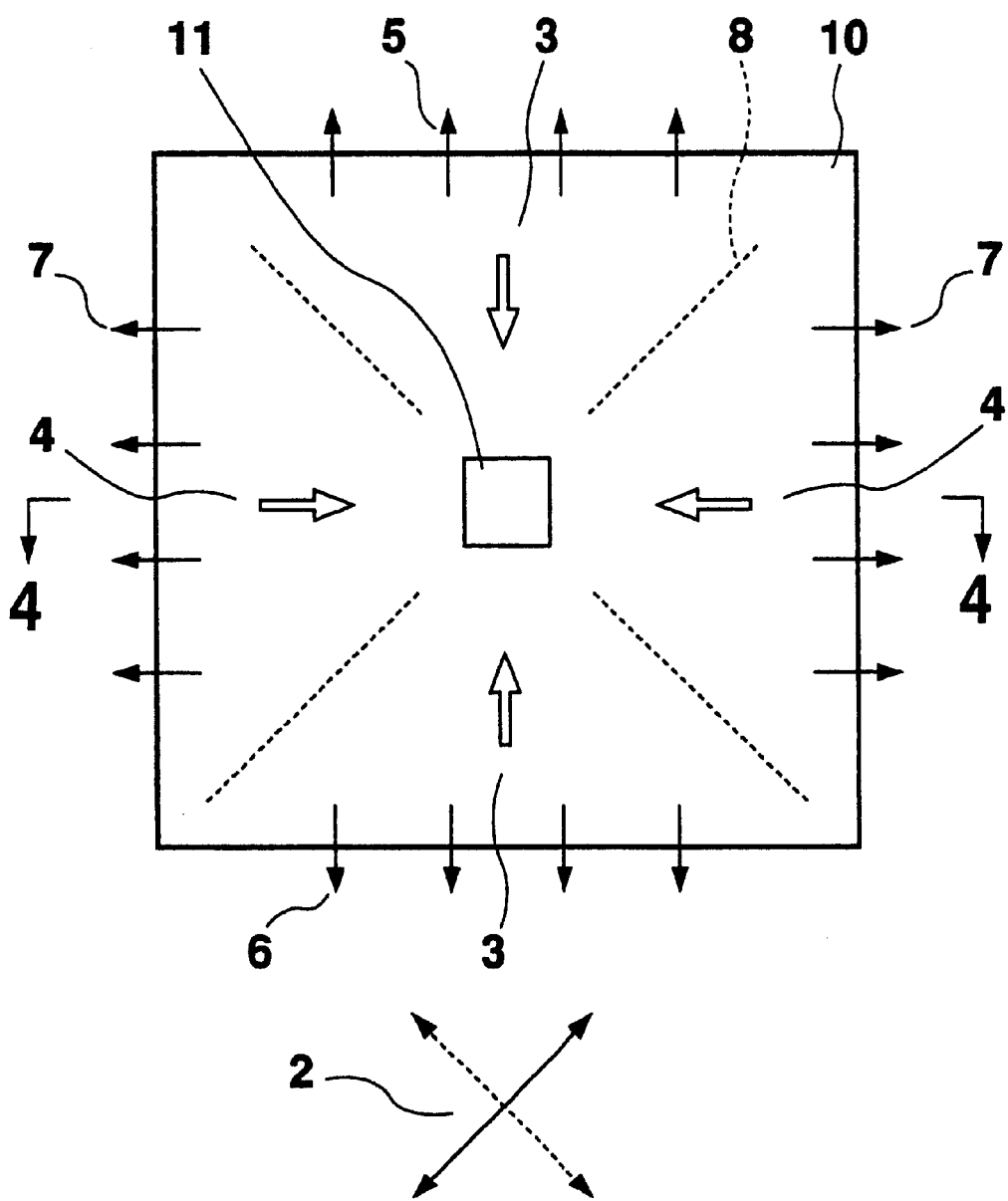
FIG. 3 is a conceptual diagram showing a reflective liquid crystal display device according to a second embodiment of the invention.
Figure 4:
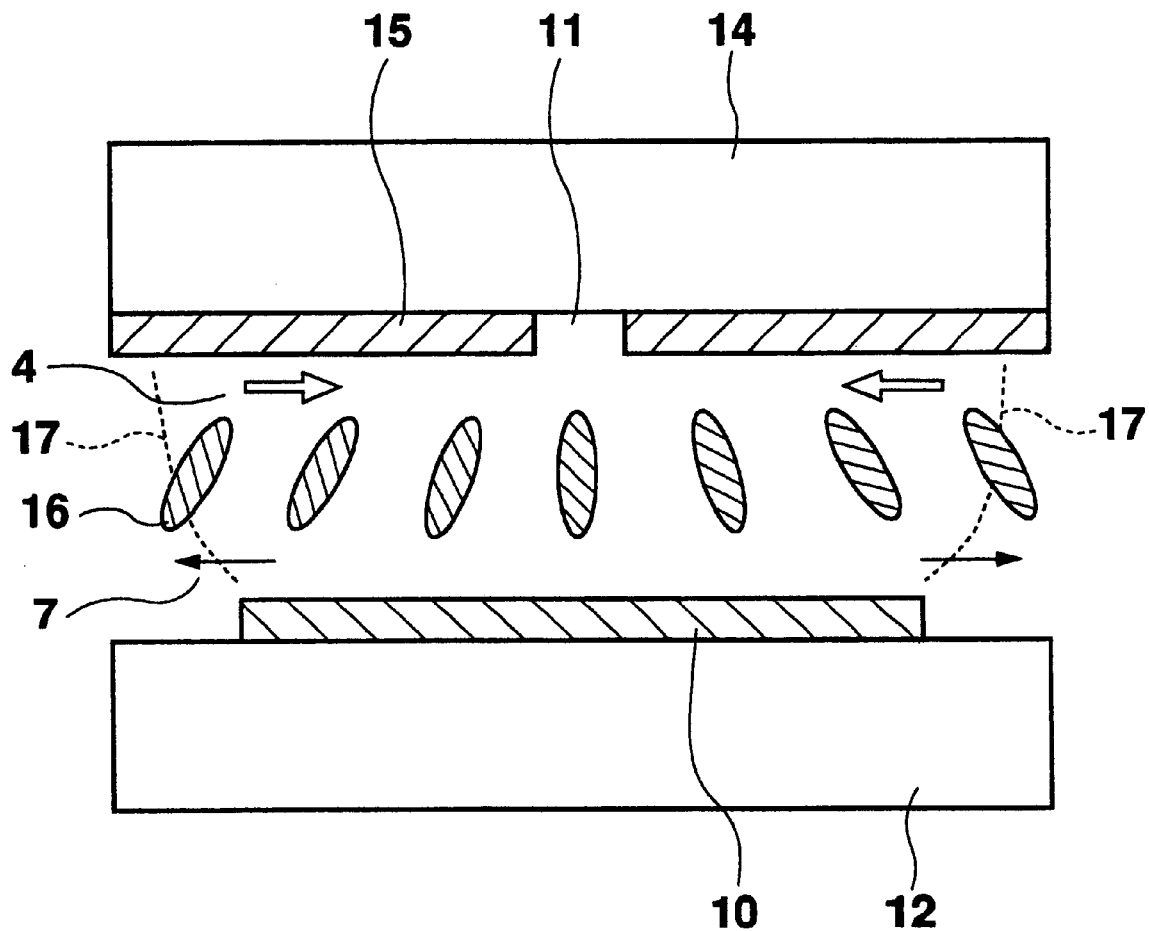
FIG. 4 is a sectional view taken along line A—A of FIG. 3.

FIG. 3 is a top view according to a second embodiment of the invention. FIG. 4 is a sectional view taken along line A—A of FIG. 3. An orientation control window 11, which is formed without an electrode layer in the transparent electrode, is disposed at the center of the display pixel according to the area of the reflective electrode 10. An electric field 17 is produced in an inclined direction at the end region of the reflective electrode 10 so to extend from the edge of the reflective electrode 10 toward the opposed transparent electrode 15. A liquid crystal 16 having a negative anisotropy of dielectric constant is tilted in directions 3, 4 opposite from inclinations 6, 7 of the electric field 17. Therefore, the azimuth angles 3, 4, that the liquid crystal tilts, are directed inward from the four sides of the display pixel. In the neighborhood of the orientation control window 11, the electric field is either nil or lower than the threshold at which the liquid crystal starts to tilt, so that the liquid crystal 16 is fixed into the initial vertically aligned state. Accordingly, the orientation in the edge of the reflective electrode 10 and the orientation in the orientation control window 11 are smoothly continued from the edge to the orientation control window 11 owing to continuity of the liquid crystal orientation, and the orientation of the liquid crystal is divided along four dot-lines 8 directed from the orientation control window 11 to four corners of the display pixel, and disclination is fixed on those lines. The disclination forms a boundary to divide the liquid crystal orientation into different tilted directions, and the tilting azimuth angles 3, 4 of the liquid crystal are divided into four directions, thereby providing a wide viewing angle.

The tilting azimuth angles 3, 4 of the liquid crystal are controlled to be stable at 45 degrees with respect to the polarization axis direction 2, the linear polarized light entering the liquid crystal 16 has an angle of 45 degrees with respect to the plane component of the optical axis of the liquid crystal 15. Reflectance can be very accurately adjusted according to the tilted angle of the liquid crystal 15 controlled based on the applied voltage.

The orientation controlled by the four sides of the display pixel is turned to the directions 3, 4. Accordingly, the polarization axis 2 of the polarizing plate is arranged to make 45 degrees with respect to the controlled azimuth of the orientation. As a result, the polarization axis of the polarizing plate in this embodiment coincides at least in part with the direction in that the disclination is extended.

Figure 5:
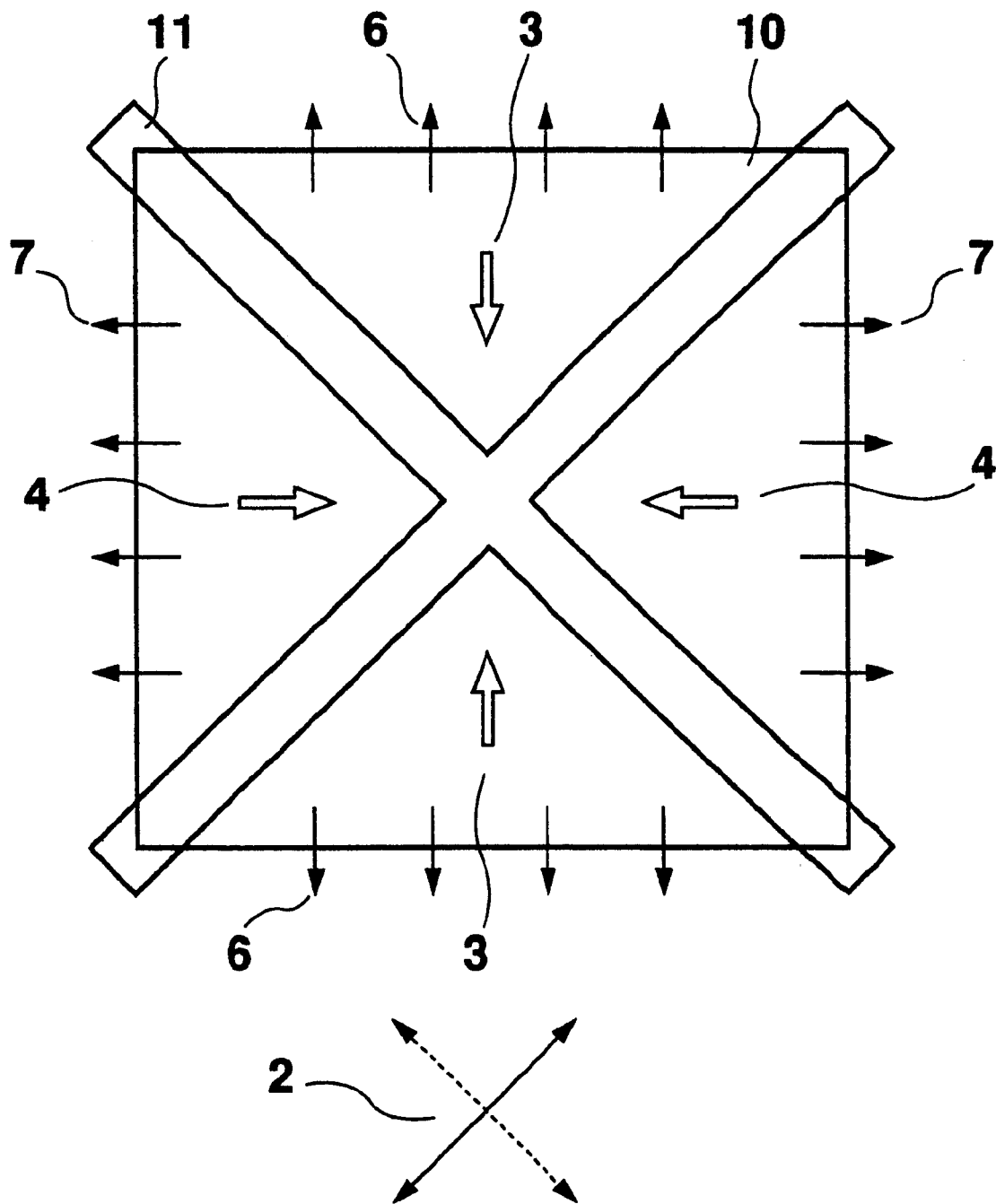
FIG. 5 is a conceptual diagram showing a reflective liquid crystal display device according to a third embodiment of the invention.

FIG. 5 shows a top view according to a third embodiment of the present invention. The orientation control window 11 is formed into an X-shape along diagonal lines over the display pixel. A region having the liquid crystal fixed in the initial vertically aligned state in the orientation control window 11 coincides to a boundary, namely disclination, which divides the orientation of the liquid crystal having the tilting azimuth angles 3, 4 controlled by the inclined electric field at the edge of the reflective electrode 10. Accordingly, a wide visual angle is achieved in the same way as in the second embodiment shown in FIG. 3, and the tilting azimuth angles 3, 4 of the liquid crystal are stabilized at 45 degrees with respect to the polarization axis 2. Reflectance can thus be very accurately adjusted by controlling the tilted angle of the liquid crystal by the applied voltage.

Figure 6:
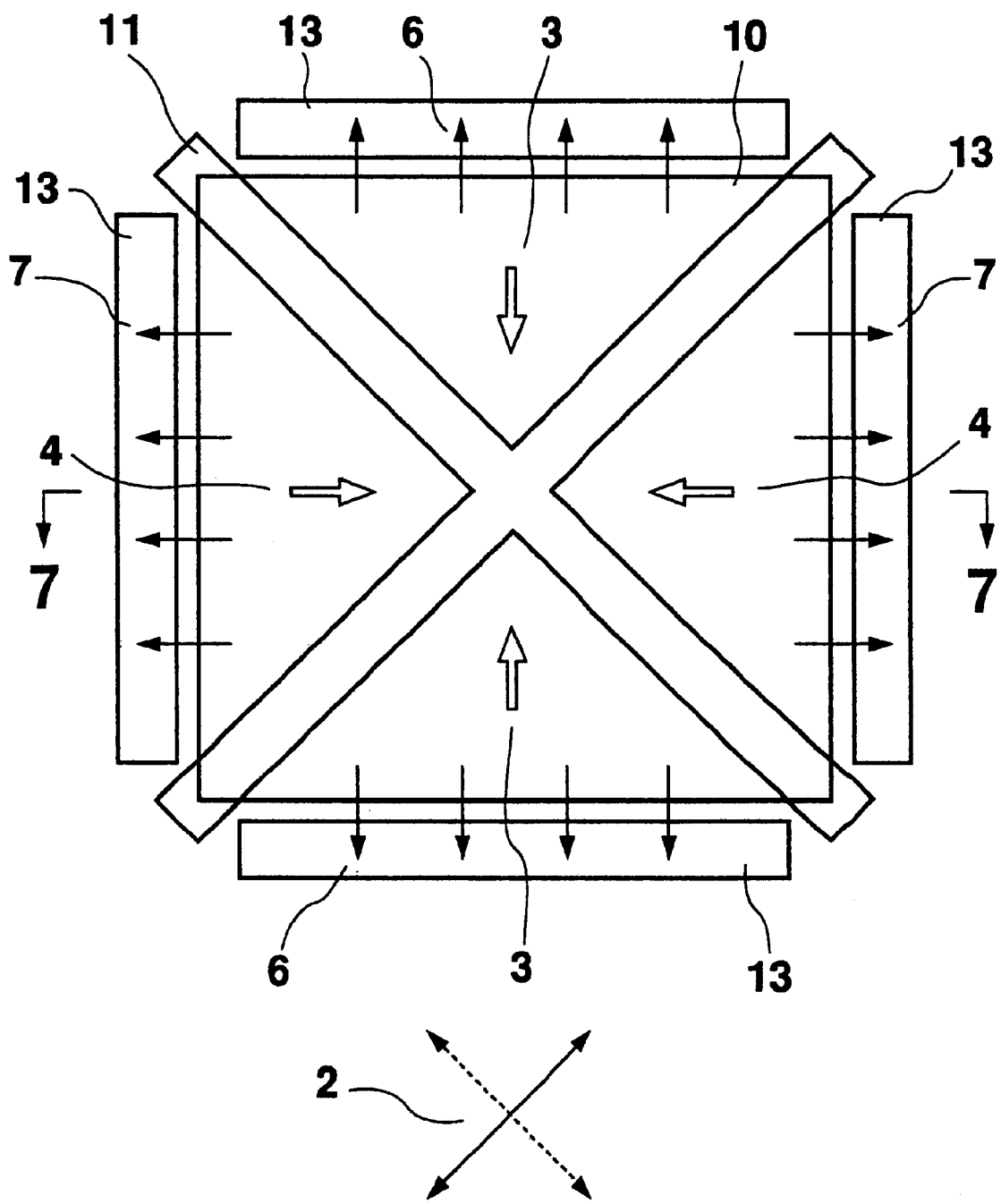
FIG. 6 is a conceptual diagram showing a reflective liquid crystal display device according to a fourth embodiment of the invention.
Figure 7:
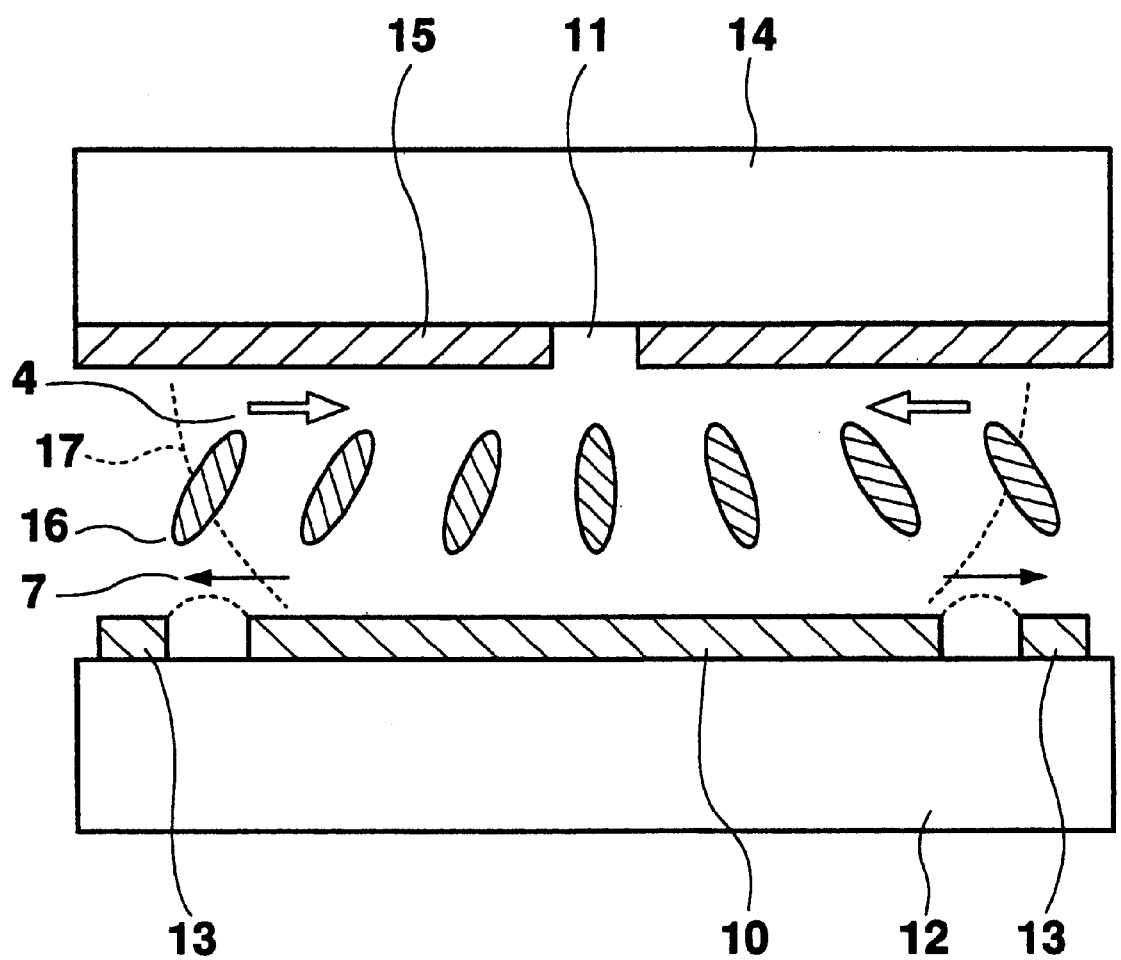
FIG. 7 is a sectional view taken along line B—B of FIG. 6.

FIG. 6 is a top view according to a fourth embodiment of the invention. FIG. 7 is a sectional view taken along line B—B of FIG. 7. In this embodiment, orientation control electrodes 13 are disposed around the reflective electrode 10. The orientation control electrode 13 is applied a voltage, which is different from the applied to the reflective electrode 10, such as the same signal voltage as the applied to the transparent electrode 15 disposed to oppose the reflective electrode 10 or having its amplitude decreased. Accordingly, the electric field from the reflective electrode 10 is directed toward the opposed transparent electrode 15 and also toward the orientation control electrodes 13 at the edges of the reflective electrode 10 to produce an intense inclined electric field 17 at the edges of the reflective electrode 10. The liquid crystal 16 having a negative anisotropy of dielectric constant is highly forced to tilt in a direction 5 opposite from the inclined electric field 17. Therefore, a wide viewing angle can be achieved by the division of orientation. And, the tilted direction 5 of the liquid crystal is made more stable and aligned in a direction to form 45 degrees with respect to the polarization axis direction 2. Thus, reflectance is adjusted very accurately by the voltage applied to the liquid crystal 16.

Figure 8:
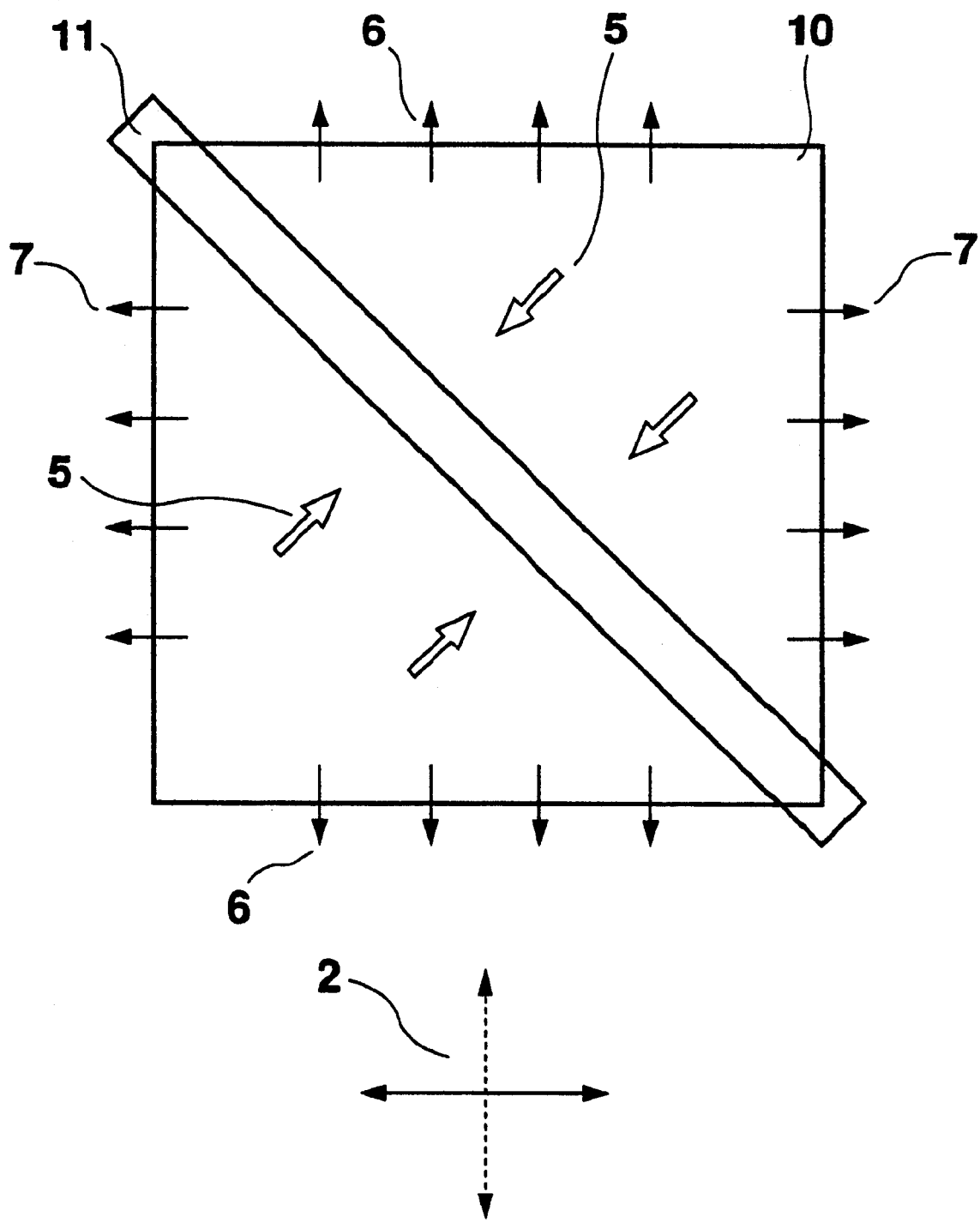
FIG. 8 is a conceptual diagram showing a reflective liquid crystal display device according to a fifth embodiment of the invention.

FIG. 8 is a top view according to a fifth embodiment of the present invention. In this embodiment, the orientation control window 11 is formed into a straight shape along one diagonal line on the display pixel. In this configuration, an azimuth angle 5 on which the liquid crystal tilts is controlled in a direction opposite from the directions of inclinations 6, 7 of the electric field at the edges of the reflective electrode 10 and also fixed in the initial vertically aligned state in the orientation control window 11. The united action of the above functions stabilizes the tilting direction 5 of the liquid crystal. And, the polarization axis direction 2 is taken to make an angle of 45 degrees with respect to the tilting direction 5 of the liquid crystal. Accordingly, the linear polarized light entering the liquid crystal is changed to ellipse polarized light according to an tilted angle depending on the intensity of the electric field applied to the liquid crystal and reflected at a desired reflectance.

Figure 9:
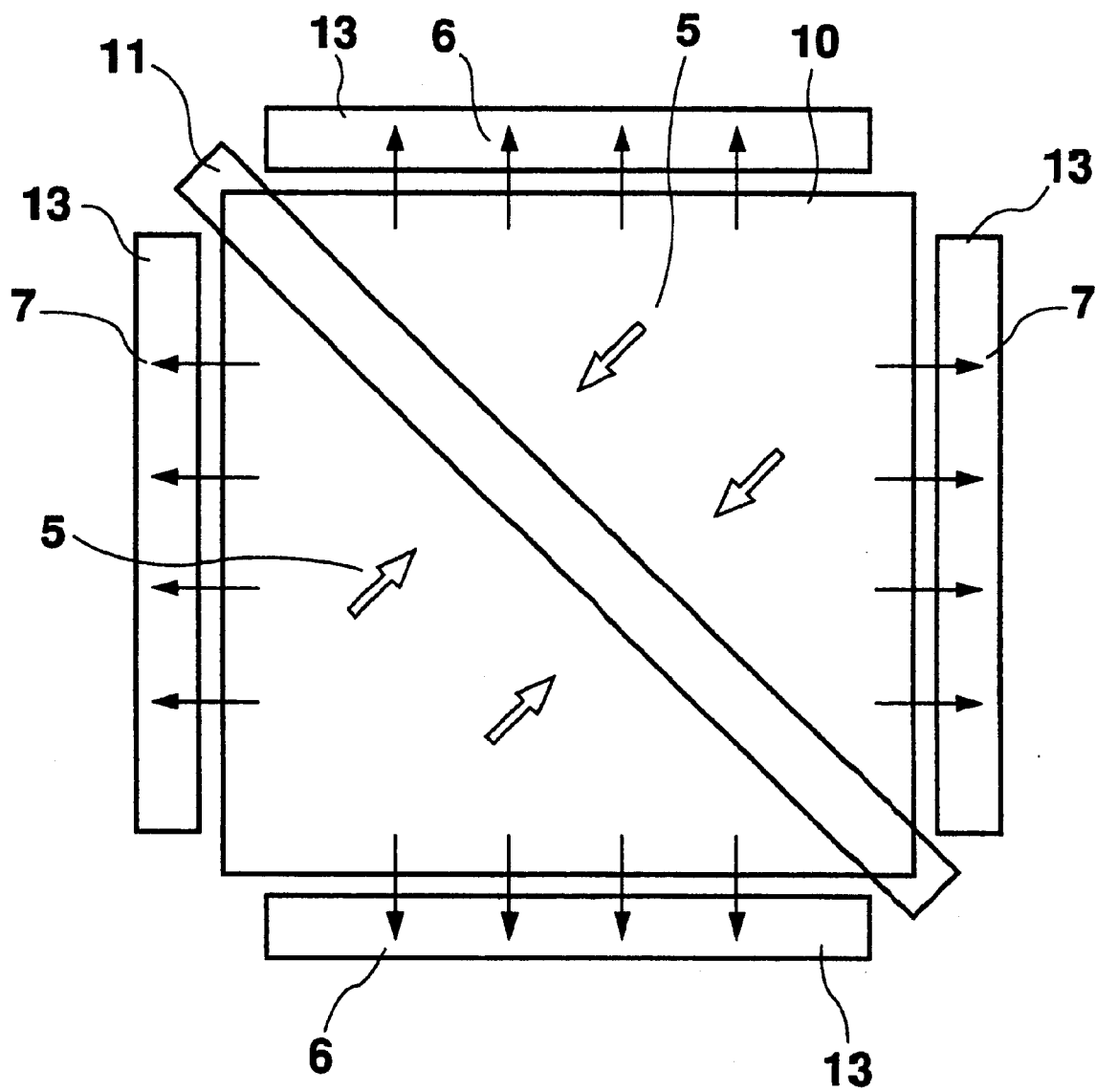
FIG. 9 is a conceptual diagram showing a reflective liquid crystal display device according to a sixth embodiment of the invention.

FIG. 9 shows a top view according to a sixth embodiment of the present invention. This embodiment has orientation control electrodes 13 disposed around the reflective electrode 10. The orientation control electrode 13 is applied a voltage that differs from that applied to the reflective electrode 10, such as the same signal voltage as the one applied to the transparent electrode or having its amplitude decreased. The electric field is formed with the reflective electrode 10. The inclined electric field at the edges of the reflective electrode 10 is made more intense in the same way as in the fourth embodiment. And in combination with the orientation control window 11, the orientation of the liquid crystal is made in better order toward an tilting azimuth angle 5. The polarization axis direction 2 is directed at 45 degrees with respect to the tilting azimuth angle 5 of liquid crystal molecules. Therefore, reflectance is adjusted very accurately by controlling the voltage applied to the liquid crystal.

Figure 10:
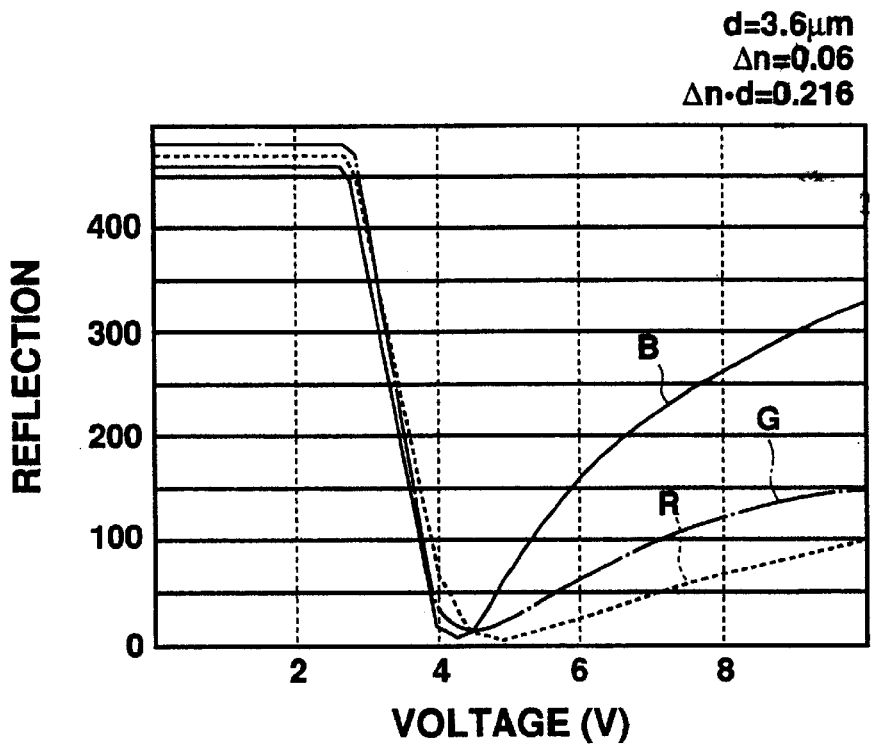
FIG. 10 is a characteristic diagram showing a voltage-reflectance relation of a reflective liquid crystal display device of the invention.
Figure 11:
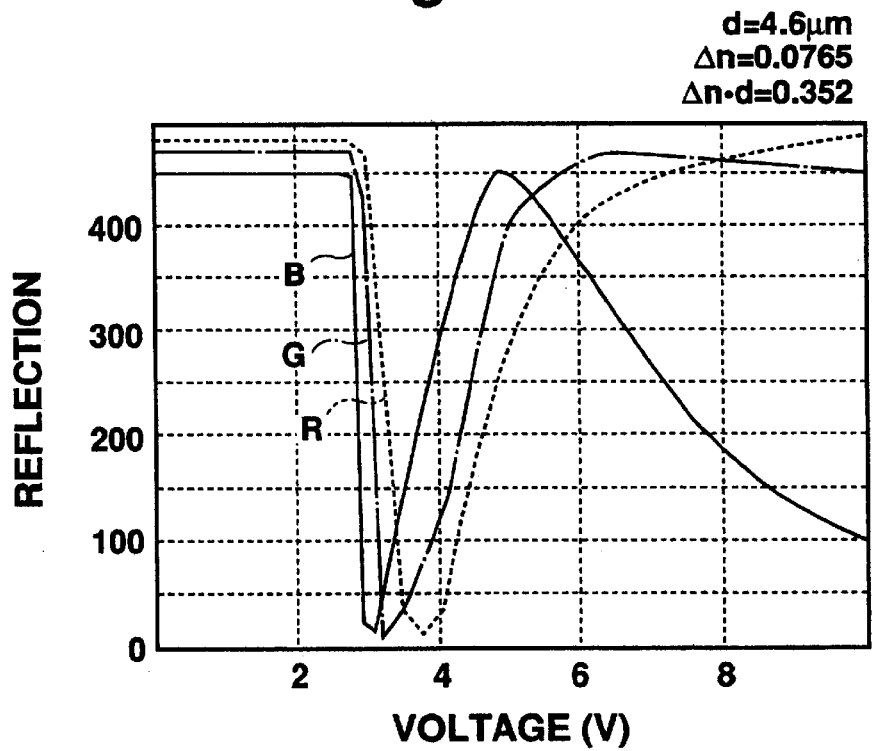
FIG. 11 is a characteristic diagram showing a voltage-reflectance relation of a reflective liquid crystal display device of the invention.
Figure 12:
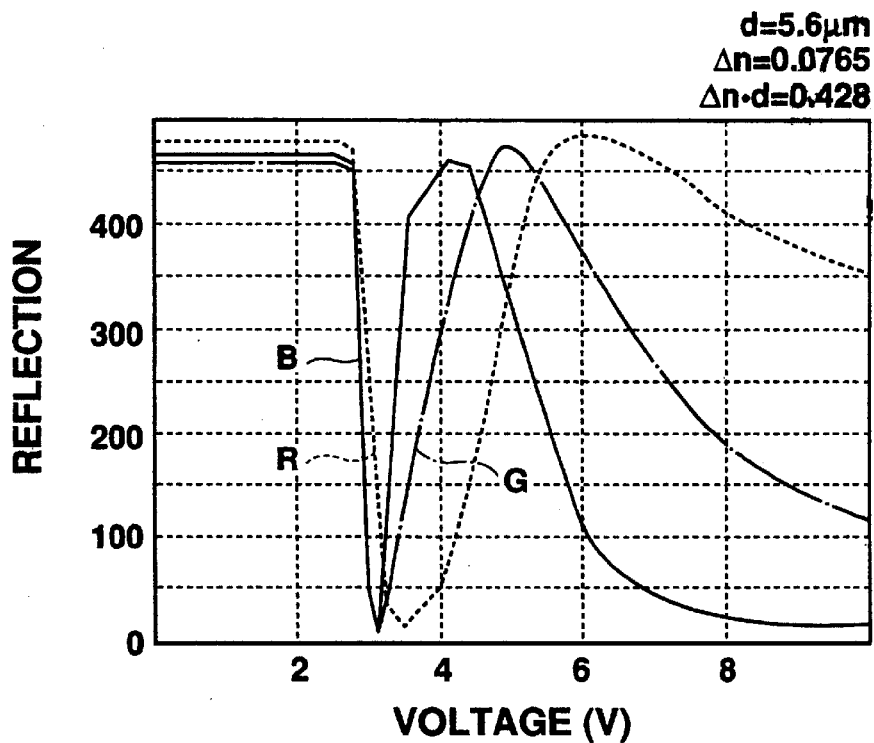
FIG. 12 is a characteristic diagram showing a voltage-reflectance relation of a reflective liquid crystal display device of the invention.
Figure 13:
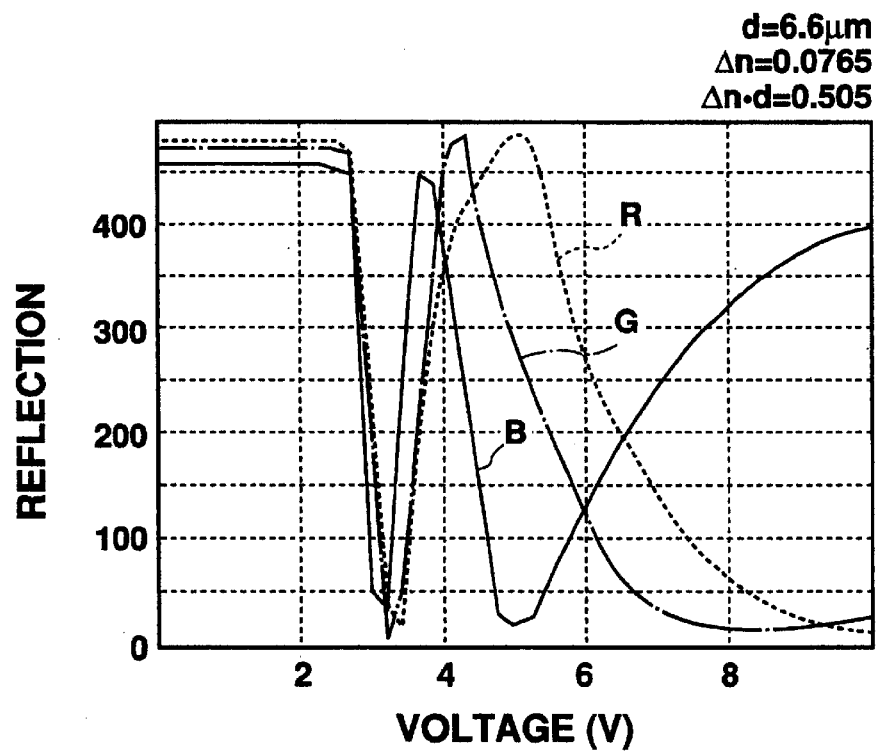
FIG. 13 is a characteristic diagram showing a voltage-reflectance relation of a reflective liquid crystal display device of the Invention.

FIG. 10 through FIG. 13 show relationships between the applied voltage and reflectance of the reflective liquid crystal display device of the invention examined under various conditions. They were examined on R, G, and B respectively. In FIG. 10, a cell gap d, an anisotropy of refractive index $\Delta n$ of the liquid crystal, and d is 3.6 $\mu$m, $\Delta n$ is 0.06 and $\Delta n \cdot d$ is 0.216 $\mu$m. In FIG. 11, d is 4.6 $\mu$m, $\Delta n$ is 0.0765, and $\Delta n \cdot d$ is 0.352 $\mu$m. In FIG. 12, d is 5.6 $\mu$m, $\Delta n$ is 0.0765, and $\Delta n \cdot d$ is 0.428 $\mu$m. In FIG. 13, d is 6.6 $\mu$m, $\Delta n$ is 0.0765, and $\Delta n \cdot d$ is 0.505 $\mu$m.

In respective drawings, when a voltage exceeding a threshold value at which the liquid crystal starts to incline is applied, good functional relationship is obtained between the applied voltage and the reflectance in the first minimum value of reflectance, namely in a range of the first minimum. It is indicated that the reflectance can be adjusted finely by the voltage control, namely gray scale display can be achieved. In FIG. 11, however, R, G, and B are different somewhat, and hue must be corrected.

Figure 14:
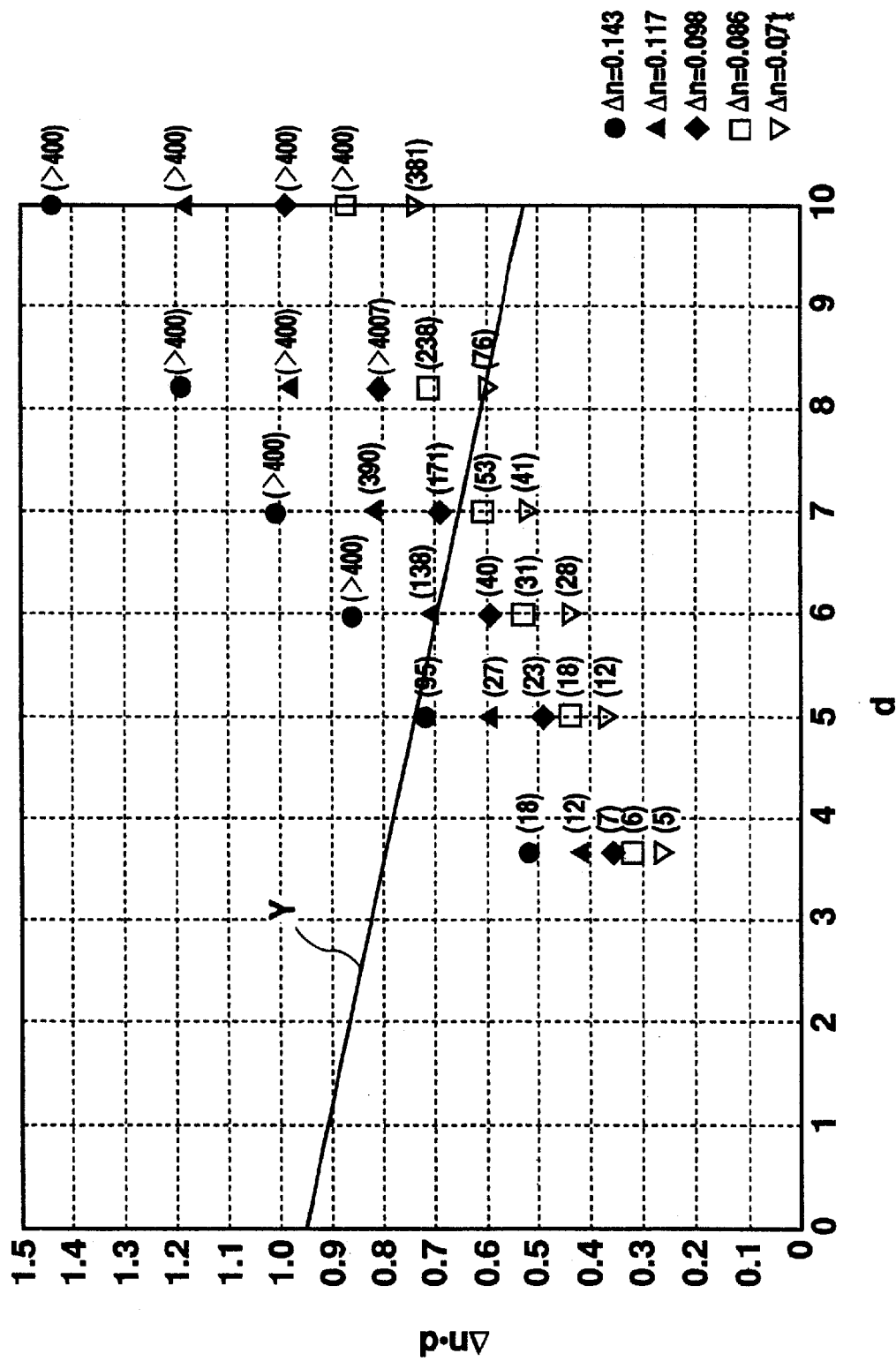
FIG. 14 shows experimental results of response time with respect to a combination of Δn·d and d of a reflective liquid crystal display device of the invention.

FIG. 14 shows all response times examined with respect to a combination of d and $\Delta n \cdot d$ when $\Delta n$ was varied. In the drawing, ▽, □, ◆, ▲ and ● indicate that $\Delta n$ is 0.071, 0.086, 0.098, 0.117 and 0.143 respectively. Parentheses indicate every response time (ns) of the measuring points. Generally, satisfactory display of animation requires a response time of 100 ns or below. And, it was found this condition can be met by the equation (1) given below.

$$\Delta n \cdot d = -0.4d + 0.95 \quad (1)$$

As seen in the drawing, the response condition is satisfied in the region below straight line Y satisfying the equation (1). Thus, it is apparent that the response highly depends on not only the value $\Delta n \cdot d$ but also the value d. In other words, it is required that the value $\Delta n \cdot d$ is small and the value d is also small. Accordingly, good animation display can be achieved by setting the cell gap d and the anisotropy of retroactive index $\Delta n$ of the liquid crystal according to the following inequality (2) in view of the equation (1).

$$\Delta n \cdot d \leq -0.4d + 0.95 \quad (2)$$

Figure 15:
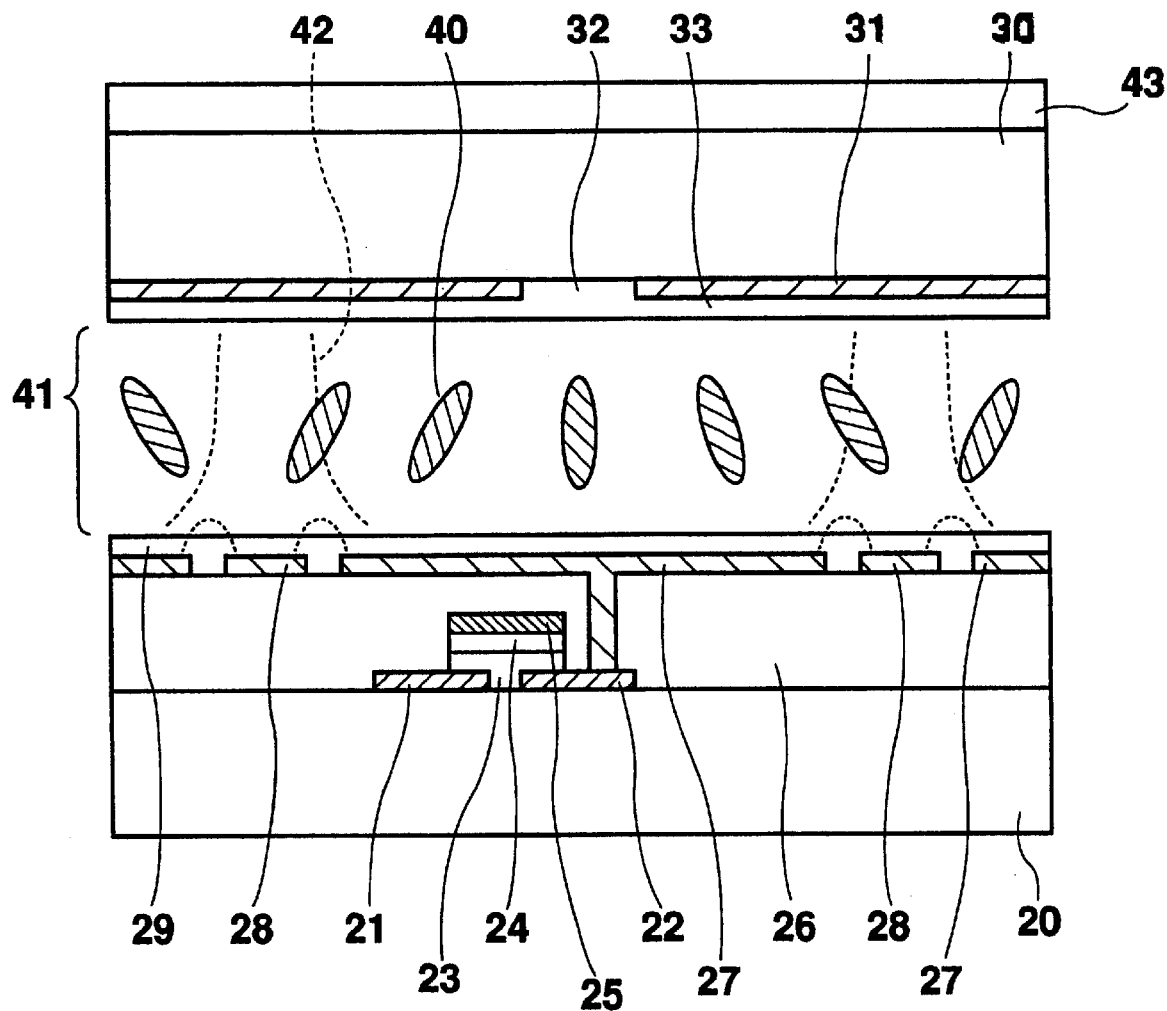
FIG. 15 is a partial sectional view of a reflective liquid crystal display device according to a seventh embodiment of the invention.

FIG. 15 is a sectional view of the reflective liquid crystal display device according to a seventh embodiment of the present invention. This liquid crystal display device is a VAN type. A drain electrode 21 and a source electrode 22 made of a low-resistive metal such as Al, Ta, Mo, Cr, or ITO (indium tin oxide) are disposed on a first substrate 20. The drain electrode 21 is integrally formed with a drain line. A semiconductor layer 23, an insulation layer 24, and a gate electrode 25 made of a low-resistive metal are formed to have the same shape on a region covering the drain electrode 21 and the source electrode 22 to form a TFT. The gate electrode 25 is integrally formed with the gate line, and the drain line is disposed to cross the gate line. A planarization insulating film 26 made from a material such as SOG (spin on glass), BPSG (boro-phospho silicate glass) or resin is formed to fully cover the TFT and its electrode and interconnection line. On the planarization insulating film 26 is formed a reflective electrode, namely a display electrode 27 made of a low-resistive reflecting material such as Al, which is connected to the source electrode 22 through a contact hole formed in the planarization insulating film 26. The TFT is formed beneath the display electrode 27. An orientation control electrode 28 made of the same material as the display electrode 27 is formed between the display electrodes 27 to surround the display electrodes 27. An alignment layer 29 of polyimide or the like is formed on the display electrodes 27 and the orientation control electrodes 28, to control the initial state of the liquid crystal in the direction of the normal.

A second, transparent substrate 30 is disposed to oppose the first substrate 20, and a transparent electrode (i.e. a transparent conductive ITO) is formed as a common electrode 31 to cover substantially all the inside face of the second substrate 30 which is opposed to the first substrate 20. An orientation control window 32 having a predetermined shape without any electrode layer is formed in the common electrode 31 in a similar manner as described in the first through sixth embodiments. A vertical alignment layer 33 is formed on the common electrode 30 and the orientation control window 32 in the same way as the first substrate 20.

Liquid crystal 40 is sandwiched between the substrates 20, 30. When a desired voltage is applied to the display electrode 27 through the TFT on the first substrate 20, an electric field having a desired strength is formed in a liquid crystal layer 41 owing to a difference between the voltage applied to the display electrode 27 and the voltage applied to the common electrode 31. The liquid crystal 40 is a nematic phase having a negative anisotropy of dielectric constant and flexibly fixed so that the initial alignment is made in the normal directions of the substrates 20, 30 owing to in interaction with the alignment layers 29, 33. The liquid crystal 40 changes its orientation according to the intensity of electric field, and the optical axis is inclined accordingly.

The same signal voltage as that applied to the common electrode 33, or a signal voltage having amplitude decreased is applied to the orientation control electrode 28 to produce an electric field with the display electrode 27. As seen in the drawing that an electric field 42 is produced to direct from the edges of the display electrode 27 toward the common electrode 31 and the orientation control electrode 28 as well. Therefore, the electric field is inclined. The liquid crystal 40 having a negative anisotropy of dielectric constant is tilted in the opposite direction and its optical axis has its tilt angle determined depending on the strength of the electric field and its azimuth angle determined in a direction opposite from the direction that the electric field 41 is inclined at the edge of the display electrode 27. In other words, since the liquid crystal is not given a pretilt, its azimuth angle is determined by the inclined electric field only in this embodiment. Boundaries of the orientation controlled to have different azimuth angles in the respective edges of the display electrode 27 are fixed by the orientation control window 32. In other words, since the neighborhood of the orientation control window 32 has no electric field or an intensity lower than threshold value at which the liquid crystal tilts, the liquid crystal 40 is kept in the initial vertical alignment state. By the combined action of the control of the orientation by the orientation control window 32 and the control of orientation at the edge of the display electrode 27, orientation of the liquid crystal is made to continue smoothly as the whole because of its continuation, and the orientation is divided at the orientation control window 32. In each region divided by the orientation control window 32, the tilt angle and the azimuth angle of the optical axis are uniformly determined by the action of the edge of the display electrode 27. A polarizing plate 43 formed on the side where light enters and goes out has its polarizing axis disposed in a direction to make 45 degrees with respect to the azimuth angle that the optical axis of the liquid crystal having the controlled alignment is inclined. Therefore, the LCD according to this embodiment has the tilt angle of the liquid crystal controlled depending on the magnitude of the applied voltage, enabling to adjust the reflectance very accurately.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. A reflective type liquid crystal display device, comprising a liquid crystal sandwiched between first and second substrates, a transparent electrode and a reflective electrode for driving the liquid crystal formed on mutually opposed inside faces of the respective substrates, and a polarizing plate formed on an outside face of one of the first or second substrates, wherein:

the liquid crystal has an optical axis in its initial align state controlled into directions of normal lines of the substrates;

a vertical alignment layer which controls a direction of the optical axis in the initial align state of the liquid crystal is formed on the respective opposed inside faces of the two substrates;

when a voltage for driving the liquid crystal is applied between the electrodes, the liquid crystal is tilted to have an azimuth of the optical axis on a plane component of the first or second substrate forming an angle of approximately 45 degrees with respect to a polarization axis direction of the polarizing plate; and an anisotropy of refractive index Δn of the liquid crystal and a distance d between the first and second electrodes satisfies the following equation:

$$\Delta n \cdot d \leq -0.4d + 0.95.$$

2. The reflective type liquid crystal display device according to claim 1, wherein an orientation control electrode is formed on a same plane where the reflective electrode is formed, but is formed away from the reflective electrode.

3. The reflective type liquid crystal display device according to claim 1, wherein:

the substrate on which the reflective electrode is formed has an orientation control electrode formed in a periphery of the reflective electrode in order to generate an electric field in a horizontal direction when the voltage for driving the liquid crystal is applied;

an orientation control window having no electrode material is formed in the transparent electrode; and when the voltage for driving the liquid crystal is applied, the azimuth that a tilting optical axis of the liquid crystal is controlled to make an angle of approximately 45 degrees with respect to the polarization axis direction of the polarizing plate by a non-electric field or a weak electric field produced by the orientation control window and an electric field near an edge of the reflective electrode controlled by the orientation control electrode.

4. The reflective type liquid crystal display device according to claim 1 wherein:

a vertical alignment layer, which controls a direction of the optical axis in the initial align state of the liquid crystal, is formed on the respective opposed inside faces of the two substrates.

5. The reflective type liquid crystal display device according to claim 1, wherein:

the transparent electrode has an orientation control window having no electrode material; and when the voltage for driving the liquid crystal is applied, the azimuth that a tilting optical axis of the liquid crystal is controlled to form an angle of approximately 45 degrees with respect to the polarization axis direction of the polarizing plate by a non-electric field or a weak electric field produced by the orientation control window and an electric field which is produced in an inclined direction at edges of the reflective electrode separately formed for each display pixel.

6. The reflective type liquid crystal display device according to claim 5, wherein the orientation control window is formed to oppose an area near a center of an opposed face of the reflective electrode.

7. The reflective type liquid crystal display device according to claim 5, wherein the orientation control window crosses an opposed region at a center of the reflective electrode and fixes disclination of the liquid crystal, which is always produced in a region where the reflective electrode is formed, into the same shape for all pixels.

8. The reflective type liquid crystal display device according to claim 1, wherein the substrate on which the reflective electrode is formed has an orientation control electrode formed in a periphery of the reflective electrode in order to stabilize the azimuth of a tilting optical axis of the liquid crystal near an edge of the reflective electrode when the voltage for driving the liquid crystal is applied.

9. The reflective type liquid crystal display device according to claim 1, further comprising thin film transistors each of which is separately connected to a corresponding reflective electrode, the thin film transistors being covered from above with the reflective electrodes through a planarization insulating film.

10. A reflective type liquid crystal display device, comprising a liquid crystal sandwiched between first and second substrates, a transparent electrode and a reflective electrode for driving the liquid crystal formed on mutually opposed inside faces of the respective substrates, and a polarizing plate formed on an outside face of one of the first or second substrates, wherein:

the liquid crystal has an optical axis in its initial align state controlled into directions of normal lines of the substrates;

when a voltage for driving the liquid crystal is applied between the electrodes, the liquid crystal is tilted to have an azimuth of the optical axis on a plane component of the first or second substrate forming an angle of approximately 45 degrees with respect to a polarization axis direction of the polarizing plate;

a vertical alignment layer which controls a direction of the optical axis in the initial align state of the liquid crystal is formed on the respective opposed inside faces of the two substrates; and the vertical alignment layers are rubbed previously in order to tilt an initial alignment slightly from the directions of the normal lines of the substrates, and the liquid crystal, when the voltage for driving the liquid crystal is applied, is controlled so that the azimuth of a tilting optical axis of the liquid crystal forms an angle of approximately 45 degrees with respect to the polarization axis direction of the polarizing plate.

11. A reflective type liquid crystal display device, comprising a liquid crystal sandwiched between first and second substrates, a transparent electrode and a reflective electrode for driving the liquid crystal formed on mutually opposed inside faces of the respective substrates, and a polarizing plate formed on an outside face of one of the first or second substrates, wherein:

the liquid crystal has an optical axis in its initial align state controlled into directions of normal lines of the substrates;

when a voltage for driving the liquid crystal is applied between the electrodes, the liquid crystal is tilted to have an azimuth of the optical axis on a plane component of the first or second substrate forming an angle of approximately 45 degrees with respect to a polarization axis direction of the polarizing plate;

a vertical alignment layer is formed on the respective oppose d inside faces of the two substrates in order to control a direction of the optical axis of the liquid crystal in the initial align state into the directions of the normal lines of the substrates, the vertical alignment layers being rubbed previously;

an orientation control window having no electrode material is formed in the transparent electrode; and when the voltage for driving the liquid crystal is applied, a direction of a non-electric field or a weak electric field produced by the orientation control window and the azimuth of a tilting optical axis of the liquid crystal controlled by an edge of the reflective electrode are con trolled to make an angle of approximately 45 degrees with respect to the polarization axis direction of the polarizing plate.

12. The reflective type liquid crystal display device according to claim 11, wherein the orientation control window is formed to oppose an area near a center of an opposed face of the reflective electrode.

13. The reflective type liquid crystal display device according to claim 11, wherein the orientation control window crosses an opposed region at a center of the reflective electrode and fixes disclination of the liquid crystal, which is always produced in a region where the reflective electrode is formed, into the same shape for all pixels.

14. The reflective type liquid crystal display device according to claim 11, wherein the substrate on which the reflective electrode is formed has an orientation control electrode formed in a periphery of the reflective electrode in order to stabilize the azimuth of a tilting optical axis of the liquid crystal near an edge of the reflective electrode when the voltage for driving the liquid crystal is applied.

15. The reflective type liquid crystal display device according to claim 14, wherein the orientation control electrode is formed on a same plane where the reflective electrode is formed, but is formed away from the reflective electrode.

* * * * *